United States Patent [19]

Lammers

[11] Patent Number: 4,988,329

[45] Date of Patent: Jan. 29, 1991

[54] FINAL DRIVE ASSEMBLY

[75] Inventor: Bryan G. Lammers, Washington, Ill.

[73] Assignee: Caterpillar Inc., Peoria, Ill.

[21] Appl. No.: 498,130

[22] Filed: Mar. 23, 1990

[51] Int. Cl.$^5$ .............................. F16H 3/44
[52] U.S. Cl. .................................. 475/337
[58] Field of Search ................ 475/331, 337

[56] References Cited

U.S. PATENT DOCUMENTS

| | | | |
|---|---|---|---|
| 2,469,905 | 5/1949 | Tatlow | 475/337 |
| 2,588,333 | 3/1952 | Wilson | 180/9.1 |
| 2,939,346 | 6/1960 | McCarthy et al. | 74/801 |
| 2,978,051 | 4/1961 | Risk et al. | 180/9.62 |
| 3,802,289 | 4/1974 | Cheek | 74/411.5 |
| 3,854,349 | 12/1974 | Michling | 475/337 |
| 3,906,818 | 9/1975 | Benthake et al. | 475/337 |
| 3,924,485 | 12/1975 | Caldwell et al. | 74/410 |
| 3,960,230 | 6/1976 | Van Wuytswinkel | 180/9.62 |
| 4,092,878 | 6/1978 | Campbell | 74/801 |
| 4,183,266 | 1/1980 | Osumi | 475/331 |
| 4,191,073 | 3/1980 | Ritter, Jr. | 475/337 |
| 4,392,396 | 7/1983 | Sato et al. | 74/785 |

FOREIGN PATENT DOCUMENTS 0211560  1/1986 Japan .................... 475/331

*Primary Examiner*—Rodney H. Bonck
*Assistant Examiner*—Ryan W. Massey
*Attorney, Agent, or Firm*—Claude F. White

[57] ABSTRACT

A final drive assembly for transferring power from a vehicle engine and transmission to a vehicle propulsion unit, such as an endless track assembly, has a power input shaft coupled to first and second planetary gear assemblies. The second planetary gear assembly is coupled to a torque tube portion of a sprocket support member for rotating a drive sprocket. The power input shaft, first and second planetary gear assemblies, and the torque tube portion are substantially co-axial, and the first and second planetary gears assemblies are positioned inwardly of the sprocket support member. By positioning the planetary assemblies inwardly of the sprocket support member, additional gears, hubs, splines, and shafts are eliminated and the planetary assemblies are less susceptible to damage. The planetary gear assemblies are substantially free-floating which eliminates the cost and complexity of additional bearing supports.

10 Claims, 2 Drawing Sheets

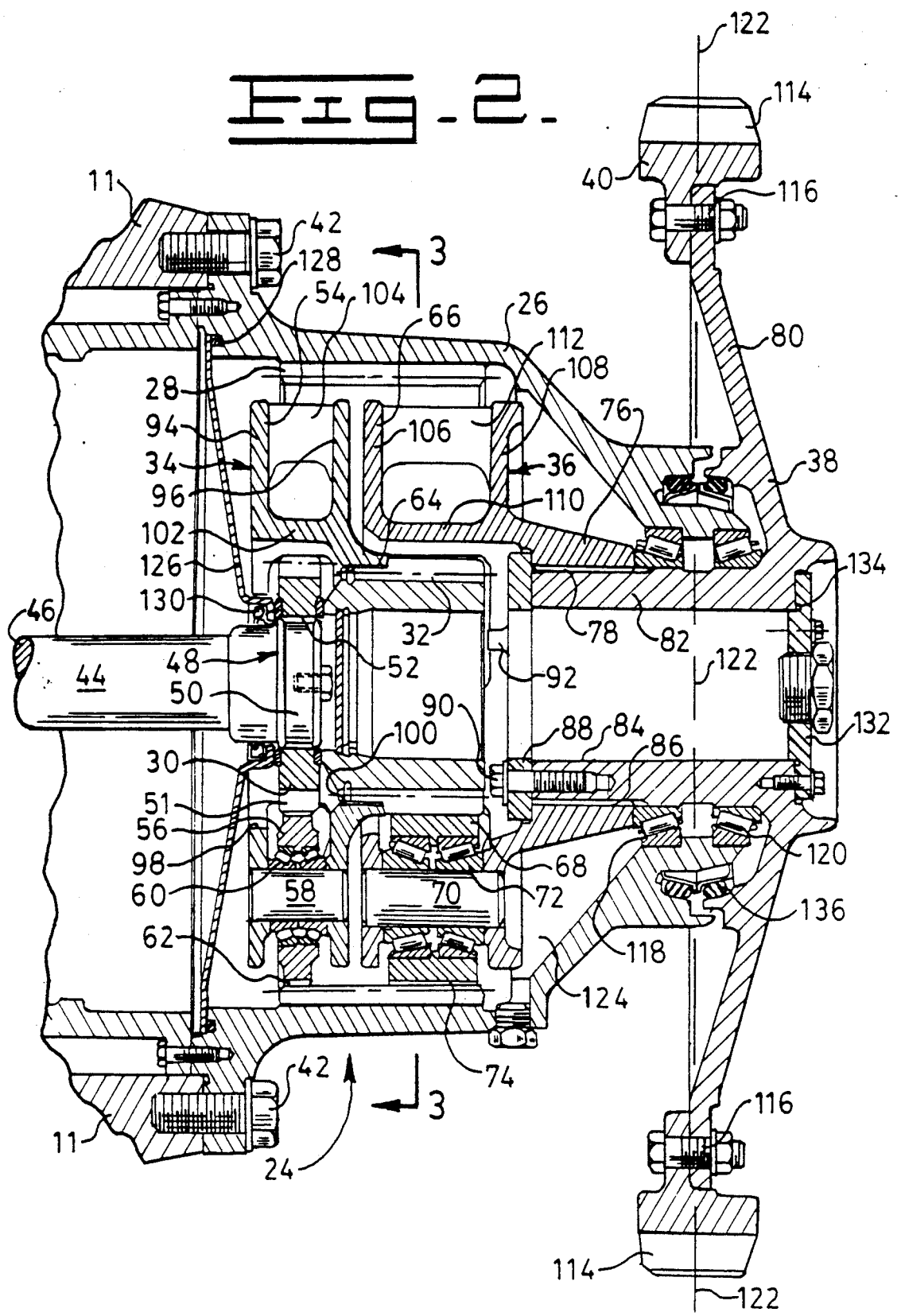

4,988,329

FINAL DRIVE ASSEMBLY

TECHNICAL FIELD

This invention relates generally to a final drive assembly for transferring power from a vehicle power unit to a vehicle propulsion unit and more particularly to a final drive assembly having a double planetary reduction gear set positioned inwardly of a sprocket assembly which is rotated by the planetary sets.

BACKGROUND ART

Earthmoving and construction type vehicles, which have endless self-laying track chain assemblies for support and propulsion, utilize a sprocket wheel to engage and drive the track chain. The sprocket is generally driven through a final drive planetary gear reduction assembly, which reduces the rotational speed of the transmission output shaft while increasing the torque available at the sprocket wheel. Many types of final drive assemblies have been used in the past including those having both single and double planetary gear reduction units, and those having no planetary assemblies.

One type of final drive assembly for a crawler vehicle is disclosed in U.S. Pat. No. 4,392,396 issued to Y. Sato et al. on July 12, 1983. In this patent, the input shaft rotates the sprocket through multiple gear connections, a planet carrier, gear shifts, and a torque tube. These multiple gears and shafts require several sets of bearings to provide rotational support within the stationary housing and between the gears and shafts. This assembly also utilizes several bolted joints, some of which are subjected to high torque shear loads.

Another type of final drive assembly is disclosed in U.S. Pat. No. 3,802,289 issued to M. E. Creek on Apr. 9, 1974. In this patent, a final drive gear train transmits power from a hydrostatic drive motor to a track driving sprocket. This disclosure relates to a two piece housing which is bolted together and to means for securing the various gears in place while the sprocket and outside cover are removed. This design requires a plurality of tapered bearing assemblies for rotatably supporting the various gears and closely machined mating surfaces for properly preloading the bearing assemblies. The splines securing the drive sprocket to the mating shaft must also absorb bending loads generated by the track assembly. Also, this final drive is not a planetary reduction type final drive, which the subject invention relates to.

The present invention is directed to overcoming one or more of the problems as set forth above.

DISCLOSURE OF THE INVENTION

In one aspect of the present invention, a final drive assembly for a vehicle, for transferring power from a power input shaft of the vehicle to a propulsion unit, includes a stationary housing for supporting the final drive assembly, first and second sun gears, first and second planet assemblies, a sprocket support member, and a sprocket wheel secured to the support member. The final drive assembly further includes a plurality of bearing assemblies which rotatably support the sprocket support member within the housing. The power input shaft, the first and second planet assemblies, and the support member are arranged to be substantially co-axial.

In prior art planetary final drive assemblies, the planetary gear sets are often located outwardly of the drive sprocket. With such an arrangement, the rotating planetary gear sets and associated hub are susceptible to damage since they are relatively unprotected. The drive sprocket of such prior art assemblies are generally cantilevered, or offset, with respect to the bearings which support the sprocket on the stationary housing. This can lead to bending or distortion of the supporting structure, the drive sprocket, and associated planetary gear sets. Such prior designs also require additional parts to support the gear sets and react to torque loads. The subject invention has the planetary gear sets positioned inwardly of the drive sprocket, and the bearings which support the drive sprocket are substantially directly in line with the sprocket teeth. The planetary gear sets, of the subject invention, are substantially free floating and require no bearings to support the planetary set within the final drive housing, and require no hub to transfer torque from the ring gear to the support structure.

BRIEF DESCRIPTION OF THE DRAWINGS

FIG. 2 is a diagrammatic sectional view through the final drive assembly of the present invention, taken generally along lines 2—2 of FIG. 1.

BEST MODE FOR CARRYING OUT THE INVENTION

Figure 1:
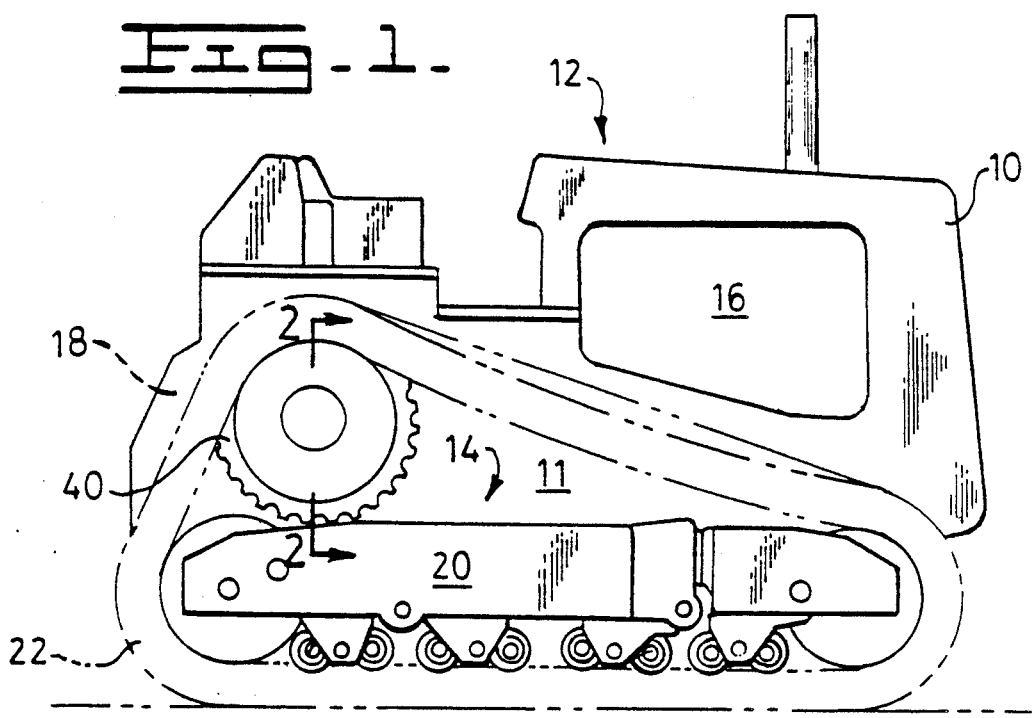
FIG. 1 is a diagrammatic side elevational view of a vehicle incorporating the final drive assembly of the invention.
Figure 3:
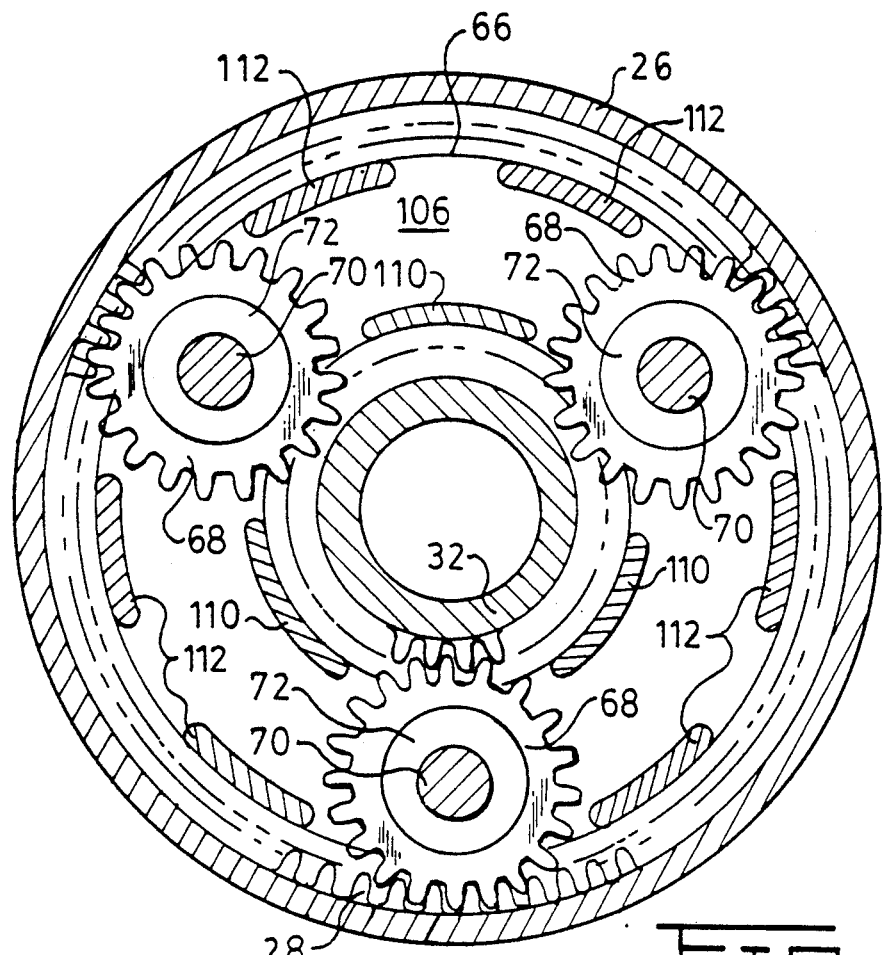
FIG. 3 is a diagrammatic sectional view taken generally along lines 3—3 of FIG. 2.

Referring to the drawings, a vehicle 10, such as a track-type tractor 10, has a main frame 11, a power generating mechanism 12 and a vehicle propulsion unit 14. The power generating mechanism 12 includes an engine 16 and a transmission 18, and the propulsion unit 14 includes a track roller frame 20 and an endless track assembly 22.

A power transfer assembly 24, such as a final drive assembly 24, is adapted to transfer power from the vehicle power generating mechanism 12 to the vehicle propulsion unit 14. The final drive assembly 24 includes a stationary, non-rotatable housing 26, which has an integrally formed internal ring gear portion 28. The housing encloses and supports portions of the final drive assembly 24. The assembly 24 further includes first and second sun gears 30,32, first and second planet assemblies 34,36, a sprocket support member 38, and a sprocket wheel 40. The sprocket wheel 40 preferably comprises a plurality of replaceable segments. A plurality of threaded fasteners 42 releasably secures the housing 26 to the main frame 11.

A relatively high speed, low torque power input shaft 44 has a first end portion 46 connected to the power generating mechanism 12 and a second end portion 48 having splines 50. The first sun gear 30 has a plurality of external teeth 51 and internal splines 52 which mate with splines 50 to rotatably connect the first sun gear to the power input shaft 44. The first planet assembly 34 includes a first planet carrier 54 and a plurality of first planet gears 56, each gear 56 being rotatably supported within the first carrier 54 by a straight surfaced, non shouldered first mounting pin 58. Bearing assemblies 60 are positioned between each pin 58 and each planet gear 56 to provide for rotation of each gear 56 on each pin 58 within the first carrier 54. The bearings assemblies 60 are preloaded between the inner faces of the planet carrier 54. Each planet gear 56 has a plurality of external teeth 62 which are in mesh with the external teeth 51 of the first sun gear 30 and with the ring gear 28. The first planet carrier 54 has a plurality of internally formed teeth 64 which mesh with the teeth of the second sun gear 32.

The second planet assembly 36 includes a second planet carrier 66 and a plurality of second planet gears 68. Each planet gear 68 is rotatably supported within the second planet carrier 66 by a straight surfaced, non-shouldered second mounting pin 70 and bearing assemblies 72. Each of the planet gears 68 has a plurality of external teeth 74 which are in mesh with the second sun gear 32 and with the ring gear 28. The second planet assembly 36 is thereby rotatably connected to the first planet assembly 34 through the connection of the second sun gear 32. The second carrier 66 has a radially extending collar portion 76 which has a plurality of internally formed splines 78.

The sprocket support member 38 has a hub portion 80 and a torque tube portion 82, with the hub and tube portions 80,82 being integrally formed as a single element. The torque tube portion 82 has a first end 84 having a plurality of externally formed splines 86. The splines 78 are adapted to mate with the splines 86 to rotatably connect the second planet carrier 66 with the tubular portion 82 of the sprocket support member 38. A retainer plate 88 is secured by a plurality of threaded fasteners 90 to the first end 84 of the tube portion 82, for retaining the second planet carrier 66 and the tube portion 82 in a connected relationship. The retaining plate 88 has a plurality of radially extending projections 92 which limit the axial movement of the second sun gear 32.

The first planet carrier 54 includes first and second spaced parallel plate members 94,96, with each plate member 94,96 having respective center bores 98,100. The plate members 94,96 are interconnected by first and second groups of spaced ribs 102,104. The first group of ribs 102 are positioned adjacent the center bores 98,100 and the second group of ribs 104 are positioned adjacent the peripheral surfaces of the first and second plate members 94,96. The second planet carrier 66 is similar to the first planet carrier 54 and includes third and fourth spaced parallel plate members 106,108 and third and fourth groups of spaced ribs 110,112 which interconnect the third and fourth plate members 106,108. Each of the ribs 102,104,110,112 has an elongated cross-sectional shape and has a a length to width ratio of about eight to one.

The sprocket wheel 40 has a plurality of teeth 114 which are adapted to engage and rotate the endless track assembly 22 for propelling the vehicle 10. The sprocket wheel 40 is releasably secured to the support member hub portion 80 by a plurality of threaded fasteners 116. First and second spaced apart bearing assemblies 118,120 rotatably support the tubular portion 82 of the support member 38 within the housing 26. The first and second bearing assemblies 118,120 are positioned substantially equidistant from a plane 122 which substantially bisects the sprocket wheel teeth 114.

With particular reference to FIG. 2, it is to be noted that the power input shaft 44, the first and second planet assemblies 34,36, and the support member tubular portion 82 are all substantially co-axial. It is also to be noted that the first and second planet assemblies 34,36 are positioned laterally inwardly of the sprocket support member 38. This arrangement eliminates additional gears, hubs, splines, and shafts and makes the planetary assemblies 34,36 less susceptible to damage. Another notable feature of the present invention is the free-floating arrangement of the input shaft 44 and the first and second planetary assemblies 34,36, which eliminates the cost and complexity of bearing assemblies.

The housing 26 forms a cavity 124 which is partially filled with lubricating fluid for lubricating the final drive assembly. A rear cover plate 126 and seals 128,130 seal the rear portion of the cavity 124. A front cover plate 132, seal 134, and seal assembly 138 seal the front portion of the cavity 124.

INDUSTRIAL APPLICABILITY

The subject final drive assembly 24 is particularly useful with earthmoving equipment, such as a self-laying track-type vehicle 10. The final drive assembly 24 is utilized to transfer power from the vehicle engine 16 and transmission 18 to the endless track assembly 22. Specifically, the transmission 18 rotates the input shaft 44 and the power is transferred from this relatively high-speed, low torque shaft 44 through the final drive assemblY 24 to the relatively low-speed, high torque sprocket wheel 40. As the sprocket wheel 40 rotates, it engages the endless track assembly 22 to propel the vehicle 10.

As the input shaft 44 rotates, it rotates the first sun gear 30 which rotates the plurality of first planet gears 56. Because the first planet gears 56 are pinned to the first planet carrier and are connected to the first sun gear 30 and to the stationary ring gear portion 28, they rotate the first planet carrier 54. The internal teeth 64 of the first planet carrier 54 are in mesh with the teeth of the second sun gear 32, which is connected to the plurality of second planet gears 68, which are also in mesh with the stationary ring gear portion 28. Because the second planet gears 68 are pinned to the second planet carrier 66, they rotate the second planet carrier 66. The internal splines 78 of the second planet carrier 66 are in mesh with the splines 86 of the torque tube portion 82 and thereby rotates the sprocket support member 38. The sprocket wheel 40 is secured to the support member 38 and, as previously noted, rotates the endless track assembly 22 to propel the vehicle 10. Any bending loads imposed on the sprocket wheel 40 and the support member 38 are transferred into the stationary housing 26 through the torque tube portion 82 via the first and second bearing assemblies 118,120. This removes bending loads from the connection of splines 78 and 86.

Other aspects, objects, and advantages of this invention can be obtained from a study of the drawings, the disclosure, and the appended claims.

I claim:

1. A final drive assembly for transferring power from a relatively high speed power input shaft to a relatively low speed sprocket wheel, comprising:
   a stationary housing having an internal ring gear portion;
   a first sun gear rotatably connected to said power input shaft;
   a second sun gear;
   a first planet assembly, including a first planet carrier and a plurality of first planet gears, said first planet gears being rotatably supported within said first planet carrier;
   a second planet assembly, including a second planet carrier and a plurality of second planet gears, said second planet gears being rotatably supported within said second planet carrier, said second planet assembly rotatably connected to said first planet assembly through said second sun gear;

a sprocket support member having a hub portion and a tubular portion, said tubular portion having an external surface, said second planet carrier being rotatably connected to said tubular portion;

a sprocket wheel having a plurality of teeth and being releasably secured to said support member hub portion;

a plurality of bearing assemblies positioned on the external surface of said tubular portion and rotatably supporting said support member tubular portion within said housing;

said power input shaft, said first and second planet assemblies, and said support member tubular portion being substantially co-axial; and said first and second planet assemblies being positioned laterally inwardly of said sprocket support member.

2. The final drive assembly, as set forth in claim 1, wherein said hub portion and said tubular portion of said sprocket support member are a single integrally formed member.

3. The final drive assembly, as set forth in claim 1, wherein said plurality of bearing assemblies includes first and second spaced apart bearing assemblies positioned substantially equidistant from a plane substantially bisecting said sprocket wheel teeth.

4. The final drive assembly, as set forth in claim 1, wherein said internal ring gear portion is integrally formed with said stationary housing.

5. The final drive assembly, as set forth in claim 1, wherein each of said first and second planet gears are rotatably secured within said first and second planet carriers respectively by a straight surfaced, non-shouldered retaining pin.

6. The final drive assembly, as set forth in claim 1, wherein said tubular portion includes a first end, and including a retainer plate secured to said first end for retaining said second planet carrier and said tubular portion in said connected relationship.

7. The final drive assembly, as set forth in claim 6, wherein said retainer plate includes a plurality of axially extending projections, said projections being adapted to limit axial movement of said second sun gear.

8. A final drive assembly for transferring power from a relatively high speed power input shaft to a relatively low speed sprocket wheel, comprising:

a stationary housing having an internal ring gear portion;

a first sun gear rotatably connected to said power input shaft;

a second sun gear;

a first planet assembly, including a first planet carrier and a plurality of first planet gears, said first planet gears being rotatably supported within said first planet carrier;

a second planet assembly, including a second planet carrier and a plurality of second planet gears, said second planet gears being rotatably supported within said second planet carrier, said second planet assembly rotatably connected to said first planet assembly through said second sun gear;

said first and second planet carriers each include first and second spaced plates each plate having a center bore, first and second groups of spaced ribs interconnecting said first and second plates, said first group of ribs being positioned adjacent said center bores and said second group of ribs being positioned adjacent the peripheral surfaces of said plates, said ribs having an elongated cross-sectional shape and having a length to width ratio of about eight to one;

a sprocket support member having a hub portion and a tubular portion, said second planet carrier being rotatably connected to said tubular portion;

a sprocket wheel having a plurality of teeth and being releasably secured to said support member hub portion; a plurality of bearing assemblies rotatably supporting said support member tubular portion within said housing;

said power input shaft, said first and second planet assemblies, and said support member tubular portion being substantially co-axial; and said first and second planet assemblies being positioned laterally inwardly of said sprocket support member.

9. A final drive assembly for a vehicle having a power generating mechanism, said assembly being adapted to transfer power from the vehicle power generating mechanism to a vehicle propulsion unit, said assembly comprising:

a power input shaft having a first end portion connected to said power generating mechanism and a second end portion having splines;

a stationary housing having an internal ring gear portion;

a first planet assembly, including a first planet carrier and a plurality of first planet gears, said gears being rotatably mounted within said first planet carrier;

a second planet assembly, including a second planet carrier and a plurality of second planet gears, said second planet gears being rotatably mounted within said second planet carrier;

a first sun gear rotatably connected internally to said splines of said power input shaft and externally to said first planet gears;

a second sun gear rotatably connected externally to said first carrier and in mesh with said second planet gears;

a support member having a hub portion and a tubular portion, said tubular portion having an external surface, said second planet carrier being rotatably connected to said tubular portion;

a sprocket wheel having a plurality of teeth and being releasably secured to said support member hub portion;

first and second spaced apart bearings assemblies positioned on the external surface of said tubular portion and rotatably supporting said support member tubular portion within said housing, said bearing assemblies being positioned substantially equidistant from a plane substantially bisecting said sprocket wheel teeth; and said power input shaft, said first and second planet assemblies, and said support member tubular portion being substantially co-axial.

10. A power transfer assembly for transferring power from a high speed, low torque power input shaft to a low speed, high torque sprocket wheel comprising:

a non-rotatable housing having an integrally formed internal ring gear portion, said housing enclosing portions of said power transfer assembly;

a first sun gear having internal splines and external gear teeth, said internal splines being connected to said power input shaft;

a second sun gear having external gear teeth;

a first planet gear carrier having internal gear teeth connected to said gear teeth of said second sun gear;

a plurality of first planet gears, said gears having external teeth connected to the external gear teeth of said first sun gear and to said ring gear, said first planet gears being rotatably supported within said first planet carrier;

a second planet gear carrier having internal splines;

a plurality of second planet gears, said gears having external teeth connected to the teeth of said second sun gear and to said ring gear, said second planet gears being rotatably supported within said second planet carrier;

a sprocket hub and a torque tube, said torque tube having an external surface and external splines connected to said internal splines of said second planet carrier, said sprocket hub and said torque tube being integrally formed; and a plurality of bearings positioned on the external surface of said torque tube and rotatably supporting said torque tube within said housing.

* * * * *